United States Patent [19]

Strnatka et al.

[11] Patent Number: 5,272,769
[45] Date of Patent: Dec. 21, 1993

[54] EMISSION SYSTEM COMPONENT INSPECTION SYSTEM

[75] Inventors: Kenneth J. Strnatka, Tucson, Ariz.; Rinaldo Tedeschi, Newington, Conn.

[73] Assignee: Environmental Systems Product Inc., East Granby, Conn.

[21] Appl. No.: 788,102

[22] Filed: Nov. 5, 1991

[51] Int. Cl.$^5$ ............................................. G06F 13/00
[52] U.S. Cl. ................................... 395/161; 395/155; 364/424.03; 364/424.04
[58] Field of Search ............... 395/140, 141, 142, 143, 395/155, 161; 364/505, 506, 507, 508, 424.03, 424.04, 424.05

[56] References Cited

U.S. PATENT DOCUMENTS

| | | | |
|---|---|---|---|
| 2,071,288 | 2/1937 | Thompson | 40/525 |
| 2,159,925 | 5/1939 | Wood | 364/424.03 |
| 2,474,914 | 7/1949 | Pruvis | 364/424.04 |
| 4,159,531 | 6/1979 | McGrath | 364/424.04 |
| 4,376,298 | 3/1983 | Sokol | 364/424.03 |
| 4,398,258 | 8/1983 | Naitoh et al. | 364/424.03 |
| 4,441,359 | 4/1984 | Ezoe | 364/424.03 |
| 4,853,850 | 8/1989 | Krass, Jr. et al. | 364/424.03 |
| 5,003,478 | 3/1991 | Kobayashi et al. | 364/424.03 |
| 5,046,007 | 9/1991 | McCrery et al. | 364/424.03 |
| 5,133,052 | 7/1992 | Bier et al. | 395/155 |

Primary Examiner—Phu K. Nguyen

[57] ABSTRACT

A computer-based system for providing visual images to assist in the inspection of a vehicle emission-control system and components consists of a database of text and graphics data both for emission-control systems and the individual components thereof accessible on a vehicle model and style basis. A first image provides both graphic and text relating to the complete emission-control system recalled, while highlighting one of the elements both in the text and graphics display. Each component may be highlighted in sequence. A second display may be accessed which provides an enlarged graphical display of the highlighted component with additional text, if required, to provide more detailed position data for the component to aid in the location and inspection of the highlighted component. The system may be accessed through a keyboard or keypad, which also allows the entry of inspection data for storage by the system.

11 Claims, 3 Drawing Sheets

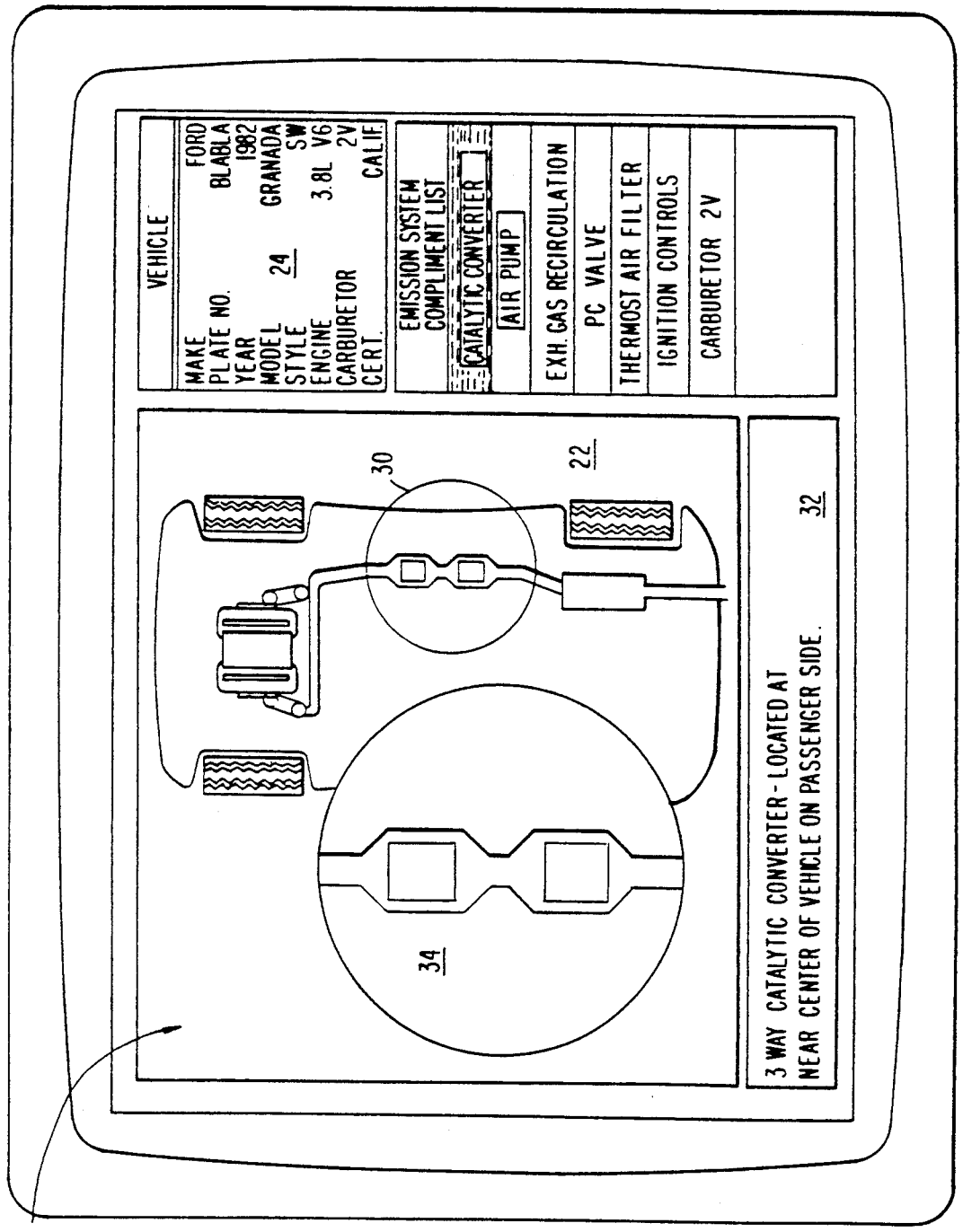

EMISSION SYSTEM COMPONENT INSPECTION SYSTEM

The present invention relates to the computer arts and, in particular, to a computer based method and apparatus for assisting a vehicle emission system inspector in performing an inspection of vehicle emission control components.

BACKGROUND OF THE INVENTION

Government mandated vehicle emission inspection programs typically require that, in addition to the substantive tests performed on the emission control system to insure that it is performing in accordance with guidelines and that produced emissions are within prescribed limits, the vehicle be visually inspected to verify that it has the proper compliment of emission control equipment, and that such equipment has not been tampered with, bypassed, or otherwise compromised. While automated and computerized analysis equipment allow the emission system inspector to typically easily perform the required performance tests, there is no similar equipment which assists the inspector in the visual inspection.

The precise location and shape of the individual emission system components are subject to variation between vehicle makes and model year. Further, as emission control techniques change and requirements become more stringent, the emission control elements employed are subject to modification and increase. It thus is often difficult for the inspector to have sufficient knowledge of the specific emission control elements which should be present on a given make, model and year vehicle. Even when the inspector knows the components which should be present, it is often difficult to properly and effectively locate and identify them on the vehicle.

It is thus the purpose of the present invention to provide an apparatus and method which allows an emission system inspector to easily locate and identify the components of an emission control system on a vehicle.

Yet another purpose of the present invention is to provide an apparatus and method which gives the vehicle emission control system inspector the ability to obtain both an overall view of the specific emission control system for the vehicle under test coupled with the further ability to isolate individual components of the system and provide a precise representation of the location and configuration of the individual components.

Still a further purpose of the present invention is to provide such an apparatus and methodology which allows the emission control system inspector to proceed, on a stepwise basis, through each of the emission control components located on a vehicle such that each, in turn, may be located and identified so that its existence and correct interconnection with the overall emission control system is confirmed and recorded.

BRIEF DESCRIPTION OF THE INVENTION

In accordance with the above and other related purposes and objects, the present invention comprises a computer-based reference system which may be incorporated either totally or in part, into hardware utilized in connection with the performance of functional tests of vehicle emission control systems. A database of vehicle emission system component information is stored on one or more mass storage devices. Means are provided to access such information on a vehicle make, model and year basis. Such data would typically include technical data regarding the components, performance and interconnections, as well as graphic format data which provides representations of the overall systems, as well as the individual components employed.

By the use of appropriate input formats and search algorithms, the emission control system inspector accesses the database for information relating to the vehicle under test. Upon receipt of an inquiry, the system displays a first image on a display screen which includes overall emission control system data for the vehicle in both graphic and text form. A first element is highlighted in both the textural and graphical representations. In order to provide a further degree of assistance, the system provides, upon the request of the operator, an enlarged view of the highlighted component, which may be presented in association with additional, detailed text permitting the component to be isolated and identified.

When the inspector has located the component under reference and has confirmed its presence and condition, the system steps to the next component, reverting to the highlight screen to allow the inspector to locate that component. The cycle may be completed until each emission control system component is checked.

BRIEF DESCRIPTION OF THE DRAWINGS

A fuller understanding of the present invention and the associated features thereof will be more fully understood upon consideration of the following detailed description of a preferred, but nonetheless illustrative embodiment of the present invention when reviewed in connection with the annexed drawings, wherein:

FIG. 3 is a representation of a typical second stage screen of the display;

DETAILED DESCRIPTION OF THE INVENTION

Figure 1:
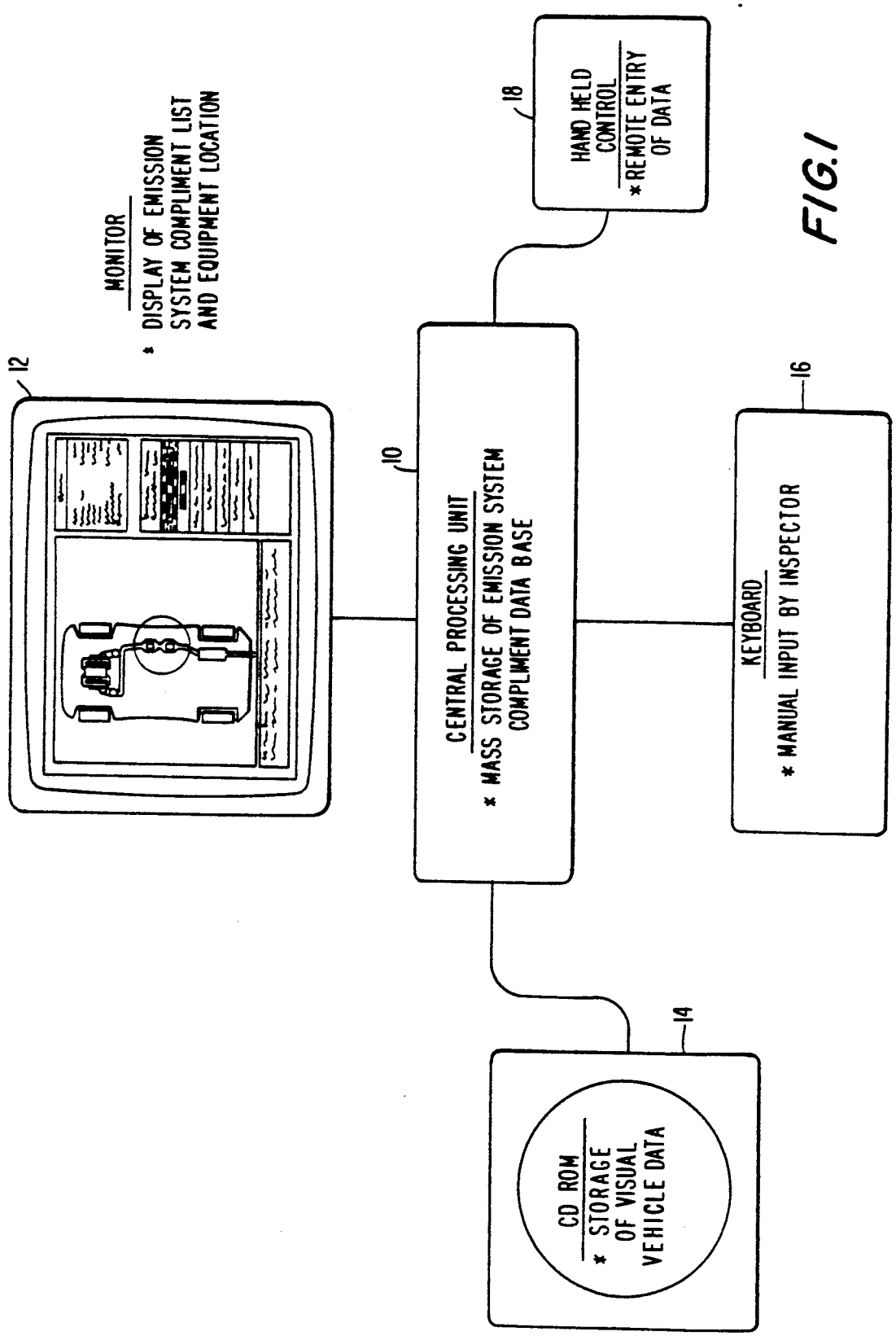
FIG. 1 is a block diagram of the elements of the present invention.

As set forth in the Figures, the present invention utilizes a central processing unit (CPU) 10 to process the information requests of the emission control system inspector and display the data on a monitor 12. The CPU 10 may preferably be of microcomputer configuration, as known in the art, and may be utilized for additional functions, such as the control and processing of mandated analytical emission tests. It may also be used for other functions, such as related governmental-mandated inspections and analyses, as well as general vehicle inspection and performance evaluation as known in the art. As generally available, personal computers incorporating microprocessor CPU's may be utilized in the present invention, and include mass storage capabilities in the form of hard discs. The text-format portion of vehicle emission control system data, is indexed on a make, model and year basis, may be stored on such a hard disc and accessed by the CPU in a manner known in the art.

The CPU 10 is further coupled to auxiliary storage unit 14, upon which the graphic data relating to the various emission control systems and components is stored. Because of the vast amount of storage required by the graphic representations needed to depict both overall and individual emission control systems and components, storage media 14 may preferably consist of compact disc read-only memory, which has the capacity for the storage of a large amount of data in a relatively small amount of space. The storage media 14 further includes such search and indexing keys as known in the art as may be necessary to associate the graphical information stored thereon with the text or primary data maintained in association with CPU 10.

Preferably, the emission control system inspector enters data into the system by way of a keyboard/keypad 16 which typically may be located in close association with the console in which the other system components are located. This permits the inspector to reference the vehicle under test, either by entering vehicle data, accessing a menu on the monitor 12, or entering other vehicle identification information. Appropriate prompts may appear on the monitor screen to assist the inspector in data entry. Access to the inspection routine may alternatively be done by appropriate internal routines from other procedures, such as the functional analysis of the vehicle's emission control system. Entered information may include, for example, a customer or other identification number associated with the vehicle under test to key a previously-created file for the vehicle. In addition to main keyboard 16 however, a secondary, hand-held controller 18 may be provided to be in additional operational contact with central processing unit 10. Controller 18 may be a keypad, coupled either by wired or wireless techniques, such as radio or infrared, as known in the art, to allow the vehicle emission control system inspector to access the system and CPU from a remote point, such as while actively performing the inspection routine. Such hand-held controller may provide fewer overall functions than may be available at the keyboard 16, but at the minimum should provide the capability of accessing the database and scrolling through the various monitor displays associated with the system under test.

Figure 2:
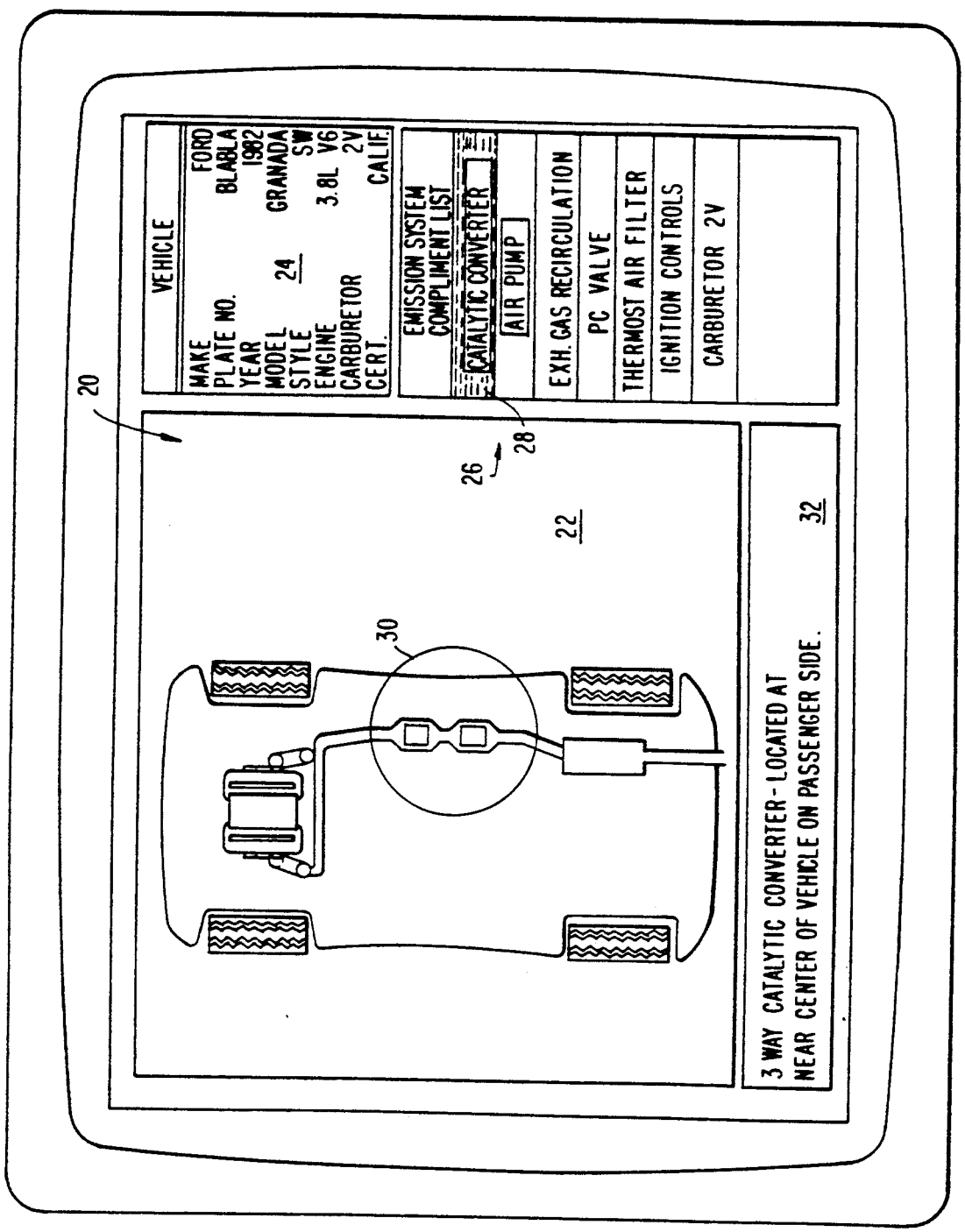
FIG. 2 is a representation of a typical screen for the display system.

FIG. 2 depicts a typical primary image created on the monitor 12 upon callup. As shown therein, the display 20 includes a graphic representation 22 of the vehicle under test, typically presenting the underside of the vehicle and presenting the emission control system components in a somewhat simplified graphical manner. The right side of the display includes an area 24 in which data for the vehicle under test is displayed, which may include make, model and style information, the vehicle's license plate or registration number and its engine and carburetor configuration, as well as information regarding the inspection standards to be applied. Also displayed is a list 26 of the components comprising the emission system of the vehicle under test which are to be inspected.

When the vehicle data is first displayed, as shown in FIG. 2, the first component on the list 26 is highlighted at 28. At the same time, the element is isolated at 30 on the graphic display 22 and a further written description of the location appears at 32 below the graphic. The display thus allows the emission control system inspector to locate the emission control components and, in particular, identify and inspect the highlighted component.

In addition to the initial display as set forth in FIG. 2, the inspector can call a second image, depicted in FIG. 3, which provides an enlarged view 34 of the isolated component. As shown, the enlarged view may be in the form of an overlay to the image 22 of the initial display. The text portions remain visible on the screen. As an alternative, the text portion 32 may also be overwritten if more detailed information is needed to assist the examiner in locating the component. Such callup may be performed through entry of an appropriate command through keypad 16 or hand-held control 18. Once the component is isolated and inspected by the inspector, an appropriate command again entered either at the keyboard 16 or hand-held control 18 permits the display to scroll whereby the next component is highlighted on the display 20. Once again, if the inspector requires further information, including a higher resolution visual reference, entry of an appropriate signal will cause a secondary display, keyed to the highlighted component, to be shown. After each component is inspected, the system may record confirmation of the inspection procedure in the appropriate vehicle file, as well as any other data or comments which may be entered by the inspector through the keyboard. The system may then be programmed to proceed with other aspects of inspection or allow another vehicle to be entered into the system.

By the use of a split screen configuration, the emission control system inspector is able to obtain a clear and precise understanding of both the emission control system under test, as well as having the capability of receiving additional detailed information which permits the inspector to conduct the visual inspection portion of the procedure in an effective manner. By use of remote control, the inspector can be positioned at the automobile and proceed through the system components in a manner which provides for an efficient test protocol.

We claim:

1. Apparatus for assisting the visual inspection of emission control system components of a vehicle under inspection, comprising data storage means for storing test and graphical data of vehicle emission control systems, including the data of the vehicle under inspection, said text and graphical data including both emission control system and individual emission control component representations and related text data; means for accessing said data storage means for retrieval of the emission control system and component data for the vehicle under inspection; means for displaying a first image comprising said graphical and related text data of the complete retrieved emission control system data; means for highlighting on said first image a single emission control component displayed therein; and means for display of a second image of a portion of said retrieved emission control system data, wherein said highlighted component is presented in an enlarged scale along with related text associated with said highlighted component.

2. The apparatus of claim 1, wherein said data storage means comprises both hard disc and compact disc read-only memory components.

3. The apparatus of claim 1 further comprising means for scrolling a highlighted portion of said first image among said emission control components displayed as part of said first image in response to a scrolling signal to choose a displayed emission control component to be presented in enlarged scale.

4. The apparatus of claim 1, wherein said display means comprises a monitor screen.

5. The apparatus of claim 3, wherein said means for accessing said data storage means comprises a computer central processor unit.

6. The apparatus of claim 5, wherein said means for accessing said data storage means further comprises first and second keypad entry means coupled to said central processor unit.

7. The apparatus of claim 6, wherein said display means is located at a first location and one of said keypad entry means is positioned at a second location remote from said first location.

8. The apparatus of claim 7, wherein said keypad entry means comprises means to generate a scrolling signal for said scrolling means and means for display of said second image.

9. The apparatus of claim 6 further comprising storage means coupled to said central processor unit for storing data relative to said emission control system and components, at least a portion of said data being entered through said keypad entry means.

10. A method for assisting the visual inspection of emission control system components of a vehicle under inspection, comprising the steps of:

creating a database of text and graphical data of vehicle emission control systems, including the data of the vehicle under inspection, said text and graphical date including both emission control system and individual emission control component representations and related text data;

accessing said database tor retrieval of the emission control system and component data for the vehicle under inspection;

displaying a first image comprising graphical and related text data of the complete retrieved emission control system data;

highlighting on said first image a single emission control component displayed therein; and displaying a second image of a portion of said retrieved emission control system data, whereby said highlighted component is presented in an enlarged scale along with related text associated with said highlighted component.

11. The method of claim 10 further comprising the step of scrolling a highlighted portion of said first image among said emission control components displayed as part of said first image in response to a scrolling signal to identify a displayed emission control component to be presented in enlarged scale.

* * * * *